United States Patent
Gordon et al.

(10) Patent No.: US 11,601,572 B2
(45) Date of Patent: Mar. 7, 2023

(54) ELECTRONIC TRACKING DEVICE FOR CAMERA AND RELATED SYSTEM FOR CONTROLLING IMAGE OUTPUT OF THE CAMERA

(71) Applicant: CAST GROUP OF COMPANIES INC., Toronto (CA)

(72) Inventors: Andrew Gordon, Toronto (CA); Navdeep Hayer, Toronto (CA); Quentin Mayet, Louvigné (FR); Gilray Densham, Inglewood (CA)

(73) Assignee: CAST GROUP OF COMPANIES INC., Toronto (CA)

( * ) Notice: Subject to any disclaimer, the term of this patent is extended or adjusted under 35 U.S.C. 154(b) by 0 days.

(21) Appl. No.: 17/632,195

(22) PCT Filed: Oct. 8, 2020

(86) PCT No.: PCT/CA2020/051348
§ 371 (c)(1),
(2) Date: Feb. 1, 2022

(87) PCT Pub. No.: WO2021/068070
PCT Pub. Date: Apr. 15, 2021

(65) Prior Publication Data
US 2022/0272235 A1   Aug. 25, 2022

Related U.S. Application Data

(60) Provisional application No. 62/912,402, filed on Oct. 8, 2019.

(51) Int. Cl.
*H04N 5/225* (2006.01)
*G06T 7/70* (2017.01)
(Continued)

(52) U.S. Cl.
CPC ......... *H04N 5/2251* (2013.01); *G01S 1/7036* (2019.08); *G06T 7/70* (2017.01);
(Continued)

(58) Field of Classification Search
CPC .. H04N 5/2251; H04N 5/23299; H04N 5/238; H04N 5/2628; H04N 5/33;
(Continued)

(56) References Cited

U.S. PATENT DOCUMENTS 6,201,579 B1 * 3/2001 Tamir .................. H04N 9/75
348/579
6,438,508 B2 * 8/2002 Tamir .................. H04N 9/75
348/E5.022

(Continued)

FOREIGN PATENT DOCUMENTS

WO   2012/027845 A2   3/2012

OTHER PUBLICATIONS

International Search Report issued in corresponding PCT Application No. PCT/CA2020/051348; Search completed Dec. 15, 2020.

*Primary Examiner* — Boubacar Abdou Tchoussou

(57) ABSTRACT

A trackable camera beacon is provided that is mountable onto a camera, so that the camera can be more easily tracked and automatically controlled. The camera beacon obtains lens data from the lens of a camera, position data corresponding to the camera beacon, and outputs a unified and synchronized data packet. The unified and synchronized output includes position, orientation and lens data. This can be used to also control the camera, such as the focus, iris and zoom parameters of the lens.

27 Claims, 14 Drawing Sheets

(51) Int. Cl.
*H04N 5/232* (2006.01)
*G01S 1/70* (2006.01)
*G06T 19/00* (2011.01)
*H04N 5/238* (2006.01)
*H04N 5/262* (2006.01)
*H04N 5/33* (2006.01)

(52) U.S. Cl.
CPC ............ *G06T 19/006* (2013.01); *H04N 5/238* (2013.01); *H04N 5/23299* (2018.08); *H04N 5/2628* (2013.01); *H04N 5/33* (2013.01); *G06T 2207/20132* (2013.01)

(58) Field of Classification Search
CPC ....... G01S 1/7036; G06T 7/70; G06T 19/006; G06T 2207/20132
See application file for complete search history.

(56) References Cited

U.S. PATENT DOCUMENTS

| | | | |
|---|---|---|---|
| 6,856,935 | B1 | 2/2005 | Fehlis et al. |
| 8,639,666 | B2 | 1/2014 | Densham et al. |
| 8,854,594 | B2 | 10/2014 | Densham et al. |
| 8,938,431 | B2 | 1/2015 | Densham et al. |
| 9,055,226 | B2 | 6/2015 | Densham et al. |
| 9,350,923 | B2 | 5/2016 | Densham et al. |
| 9,538,156 | B2 | 1/2017 | Densham et al. |
| 9,747,697 | B2 | 8/2017 | Densham et al. |
| 9,822,956 | B2 | 11/2017 | Eichel |
| 9,823,634 | B2 | 11/2017 | Densham et al. |
| 10,271,036 | B2 | 4/2019 | Phipps |
| 10,552,014 | B2 | 2/2020 | Densham et al. |
| 2007/0279494 | A1* | 12/2007 | Aman ................ H04N 5/278 348/169 |
| 2013/0128054 | A1* | 5/2013 | Densham ............ A61B 5/0002 348/169 |

* cited by examiner

ELECTRONIC TRACKING DEVICE FOR CAMERA AND RELATED SYSTEM FOR CONTROLLING IMAGE OUTPUT OF THE CAMERA

CROSS-REFERENCE TO RELATED APPLICATIONS

This patent application claims priority to U.S. Patent Application No. 62/912,402 filed on Oct. 8, 2019 and titled "Electronic Tracking Device For Camera And Related System For Controlling Image Output Of The Camera", the entire contents of which are herein incorporated by reference.

TECHNICAL FIELD

The following generally relates to an electronic tracking device for a camera and a related system for controlling the image output of the camera.

DESCRIPTION OF THE RELATED ART

Tracking objects in a physical space can be difficult, as people and things move freely and sometimes unexpectedly. When filming a movie or a live show using a camera, coordinating the camera with a targeted object or person for filming can be difficult as the camera can move and the target object or person can move.

BRIEF DESCRIPTION OF THE DRAWINGS

Embodiments will now be described by way of example only with reference to the appended drawings wherein.

DETAILED DESCRIPTION

Figure 1A:
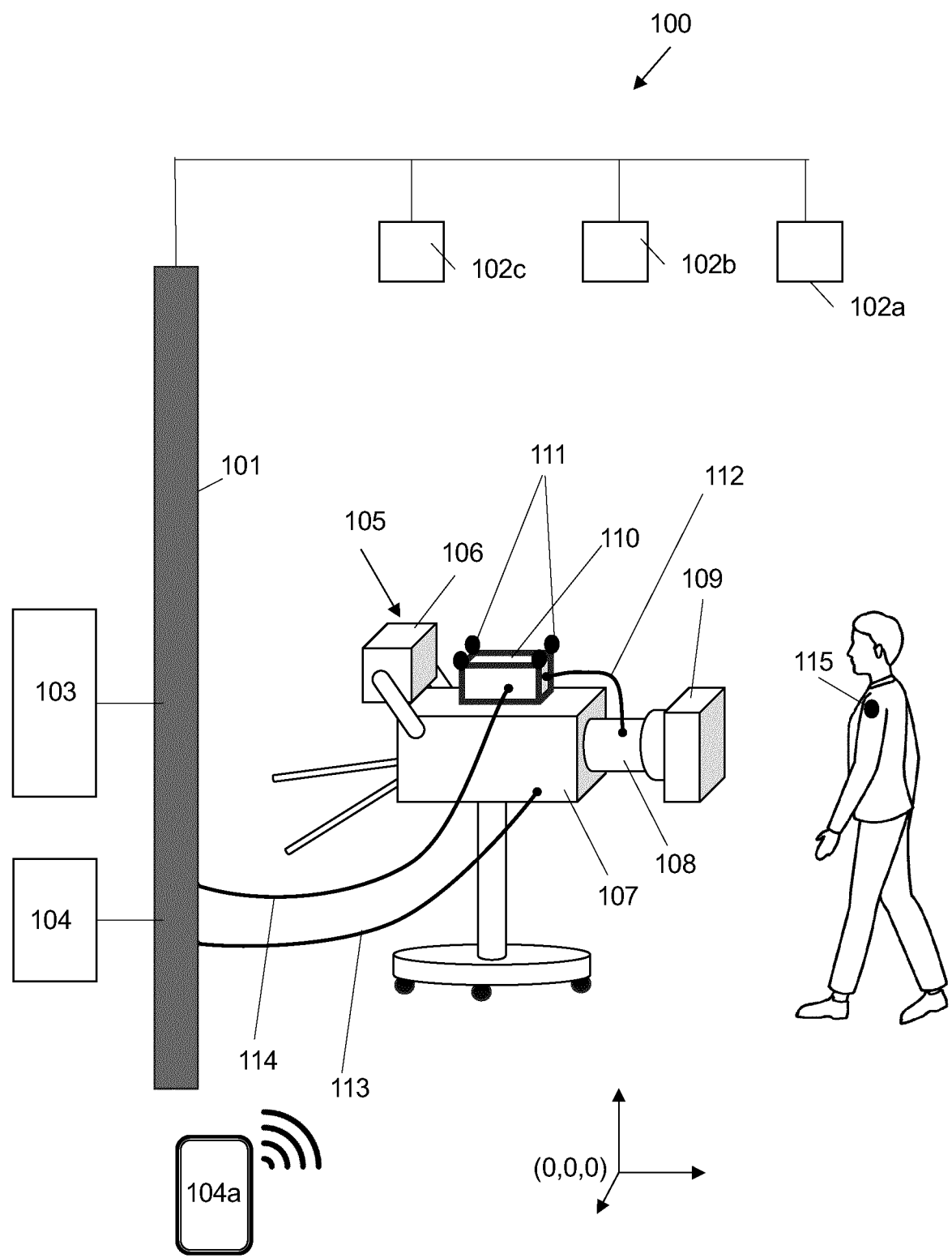
FIGS. 1A and 1B are schematic diagrams of different example embodiments of a camera tracking device, also herein called a camera beacon, integrated into a system for controlling image output of the camera.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

FIG. 1A shows a tracking system 100 that tracks the position and movement of one or more tracking beacons.

In particular, the system 100 includes optical sensors (e.g. cameras) 102a, 102b, 102c that are positioned at different locations, preferably overhead, to capture the light emitted from a given tracking beacon. In an example aspect, each tracking beacon has one or more light sources (e.g. light emitting diodes (LEDs)) that flash or blink according to a unique pattern that is detected over a series of video frames captured by the optical sensors. The optical sensors transmit the captured video data and time code information via a data network 101. A tracking server 103, which is also connected to the data network 103, receives the captured video data from the optical sensors then processes the images using image recognition to identify the position of the light sources in the image. The position information from the different optical sensors are then compared (e.g. using triangulation) by the tracking server 103 to determine the location of a given beacon in three-dimensional space.

In an example aspect, the beacons have LEDs that emit infrared light and the optical sensors 102a, 102b, 102c are cameras that detect the infrared light. In other words, the optical sensors are infrared optical sensors. In an alternative embodiment, a light in a different range of the light spectrum is emitted and is detected by the optical sensors 102a, 102b, 102c.

For example, a first LED and a second LED emit light at a different blinking pattern or blinking frequency. The blinking pattern or the blinking frequency represents an identifier (ID) that is specific to each LED. In other words, the first LED has a first ID and accordingly blinks according to a first blinking pattern or blinking frequency that is associated with the first ID, and the second LED has a second ID and accordingly blinks according to a second blinking pattern or blinking frequency that is associated with the second ID.

In other words, over a series of images, the tracking server 103 is able to detect the blinking pattern of the a given LED to identify its associated ID. In this way, the computing system is able to track the position and movement of multiple LEDs simultaneously, and the beacons associated with the LEDs.

In an example embodiment, the data network 101 is a network switch. In a further example embodiment, the data network 101 is an Ethernet network.

The system in FIG. 1A also include a camera 105 used to film a movie, television, or a video. For example, the camera 105 is used to film a person who is also wearing a tracking beacon 115 that is trackable by the optical sensors.

The camera 105 is trackable because it has mounted thereon a camera beacon 110.

The camera 105 includes a camera body 107, an image viewer 106, a lens 108, and a hood 109 mounted at the end of the lens. The camera beacon 110 is a rigid structure that is mounted to the camera 105 and, in this example, on the body 107 of the camera. The shape of the rigid structure is shown as a box in FIG. 1A, but the shape is just an example. The shape of the rigid structure for example, includes one or more of the following structural features: curved surfaces, protrusions, substructures that are rigidly connectable to each other, and attachment structures. For example, different substructures hold different components of the camera beacon. For example, one substructure holds the LEDs 111 while another substructure holds processing components of the camera beacon. It will be appreciated that different shapes, structures and configurations can be used to provide the operations of the camera beacon.

The camera beacon 110 includes three of more LEDs 111 so that it can be tracked by the optical sensors. Each LED blinks or flashes according to a unique pattern, so that the tracking server 103 can identify one LED from another. In an example aspect, the camera beacon further includes one or more inertial measurement sensors (e.g. an IMU) to measure acceleration or orientation, or both. The camera beacon includes a first port for receiving lens data from the lens 108 and a second port for transmitting and receiving data from the data network 101. For example, a data cable 112 connects a data port from the lens 108 to the first port on the camera beacon. Another data cable 114 connects a data port from the data network 101 to the second data port on the camera beacon. The camera itself includes a data port that is connected by a data cable 113 to the data network 101. In film and broadcasting industry, this data cable 113 is sometimes referred to as a trunk.

As the camera beacon 110 is rigidly mounted to the camera 105, the position, movement and orientation of the camera can be tracked using the camera beacon.

The camera 105 shown is semi-automatic or manual. For example, lens parameters of the camera, such as iris, zoom and focus, can be automatically controlled or manually controlled. For example, the focus parameter relates to the F/stop of the lens; the iris parameter relates to the amount that the iris is open; and the zoom parameter relates to the focal length of the lens. These parameters are tracked by the lens and transmitted to the camera beacon. The camera 105 shown is manually moved by a person. However, it will be appreciated that in other examples, the camera is a robotic camera that has actuators to automatically adjust pitch, roll and yaw of the camera body. In a further example aspect, the camera is mountable onto a track or a vehicle and the position of the camera is automatically controlled along the track or by the vehicle. A camera beacon 110 mounted on the camera helps to control the image outputted by the camera, including controlling position and orientation of the camera.

In an example embodiment, lens data (e.g. focus, iris, zoom) is transmitted from the lens 108 to the camera beacon 110 via the cable 112. In a further example aspect, the lens data provided by the lens 108 does not include timing data (e.g. a time code). Therefore, as part of the data processing and data unification, the camera beacon 110 appends a time code or time stamp to the lens data.

The system shown in FIG. 1A also includes a converge computing device 104 (also herein called a "converge computing system") to control the camera lens or the camera itself. For example, the converge computing device 104 obtains tracking data about a target beacon (e.g. the beacon 115 worn by a person), computes commands to affect the lens data (e.g. focus, iris, zoom adjustment), and transmits the commands to the camera beacon 110. The camera beacon in turn transmits the commands to the lens 108 to automatically adjust the lens parameters. This adjustment, for example, results in a better framing and focusing of the image about the person wearing the target beacon 115. The converge computing device 104 is, for example, connected to the data network 101. In an example aspect, the converge computing device is a server computing system. In an example aspect, the converge computing device is a media server system. In an example aspect, the converge computing device is a control system.

A control device 104a, such as a smartphone or a tablet, is used by a person to more conveniently operate the control of the camera 105 to focus in on a target beacon or to avoid the target beacon, or, more generally, control camera in relation to one or more physical objects. In other words, the control device 104a is an extension of the converge computing device 104, or an alternative thereof. The control device includes, for example, a graphical user interface for managing the control the camera 105. In an example embodiment, the control device 104a is a wired device.

It will be appreciated that although one camera 105 is shown, multiple cameras, each tracked using a respectively mounted camera beacon, can be simultaneously tracked and controlled using the system described herein.

Figure 1B:
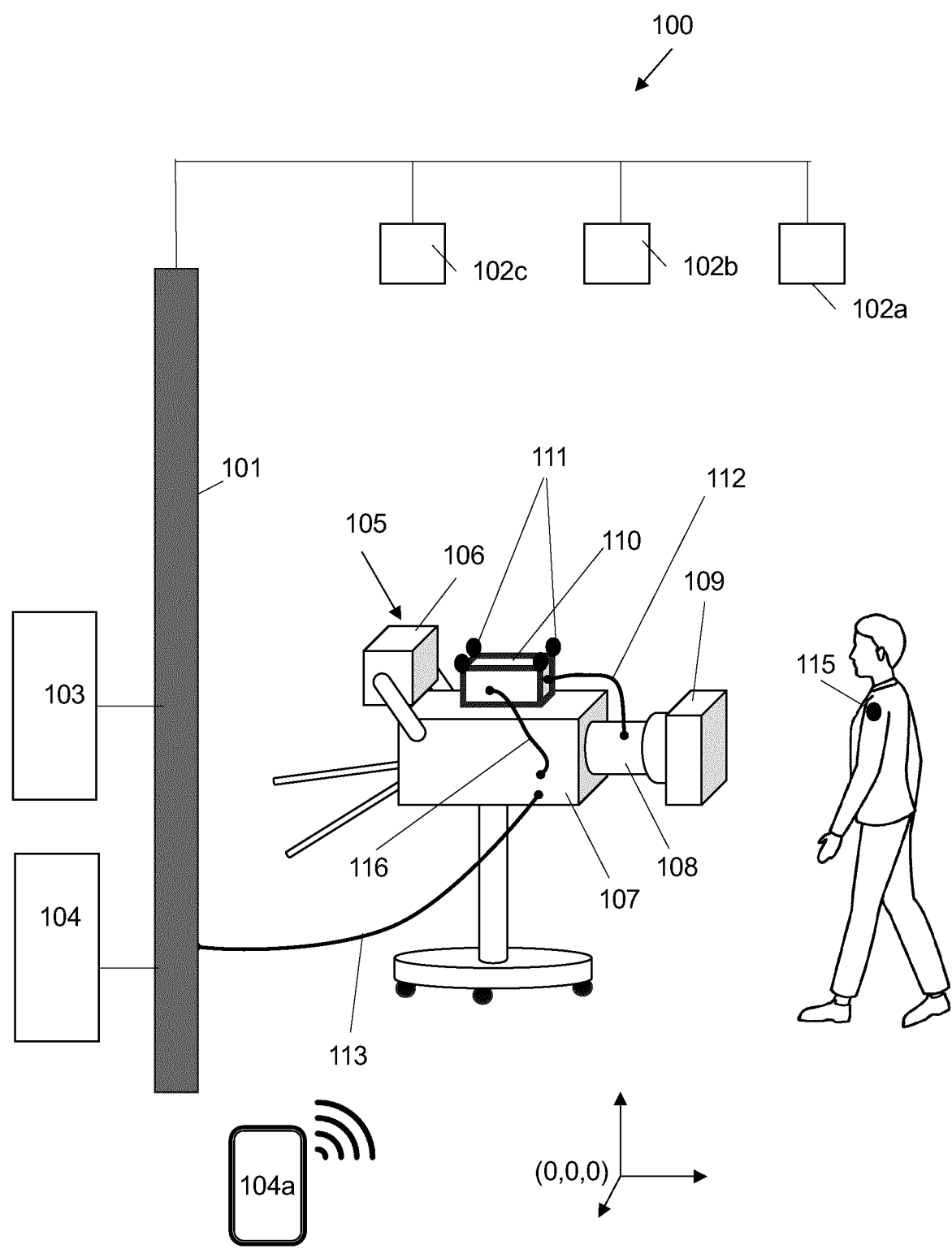

FIG. 1B is similar to FIG. 1A. However, instead of a data cable 114 extending from the camera beacon 110 to the data network 101, the camera beacon 110 is connected to the data system of the camera body 107 via a data cable 116. In this way, data that is to be transmitted between the data network 101 and the camera beacon 110 is instead transmitted via the data cable 113. The data system of the camera body 107 acts an intermediary data hub for the camera beacon to connect to the data network.

Figure 2A:
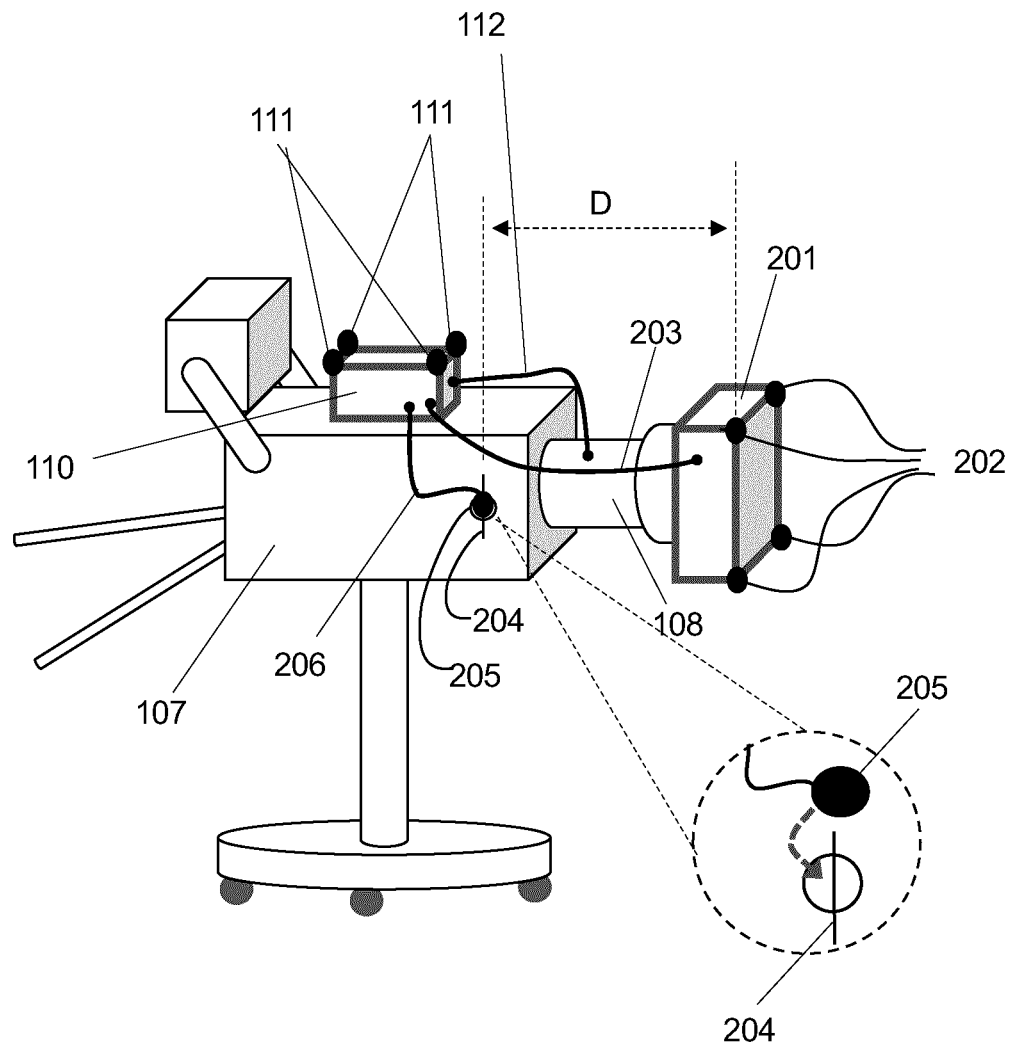
FIGS. 2A and 2B are different example embodiments of camera beacons mounted on a camera.

FIG. 2A shows another camera tracking system. A trackable hood 201 includes three or more LEDs 202 that are trackable by the optical sensors 201a, 201b, 201c. The power and control of these LEDs 202 is provided via a cable 203 that connects the camera beacon 110 to the trackable hood 202.

In a further example aspect, it is herein recognized that is desirable to easily and automatically track the position and orientation of the image sensor (e.g. a CMOS sensor, a CCD sensor, or some other sensor type) in the camera body 107 relative to the lens 108. Camera's typically have a marking 204 that identifies where the face of the image sensor is positioned in the body. Therefore, an LED 205 is mounted onto the marking 204, and this LED 205 is powered and controlled by the camera beacon 110 via a cable 206. The position of the LED 205 and the position of the lens or the camera hood allows the converge computing device to determine the distance D between the image sensor and the end of the lens. This distance D is used, for example, to more accurately control the focus, zoom and iris of the lens.

Figure 2B:
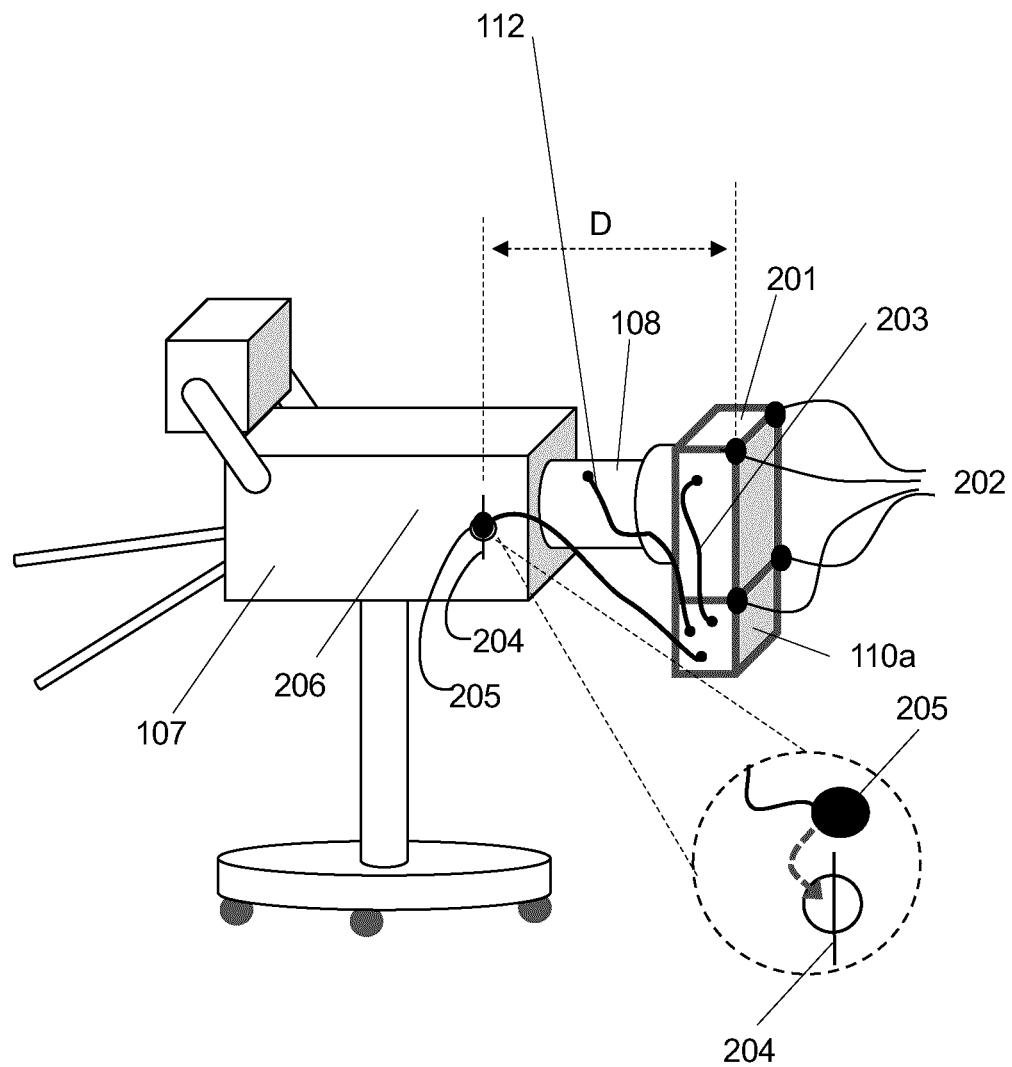

FIG. 2B shows another example embodiment that includes the trackable hood 201. In this example, the camera beacon 110a is attached to or integrated with the trackable hood 201.

Figure 3:
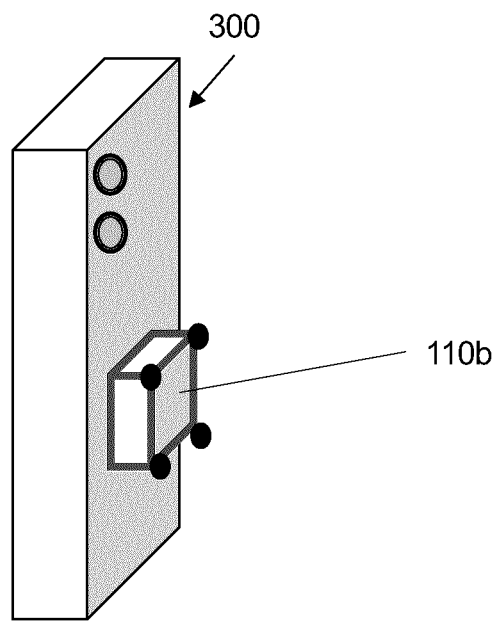
FIG. 3 is a perspective view of a camera beacon mounted on a smart phone according to an example embodiment.

FIG. 3 shows an example embodiment of a camera beacon 110b mounted to a smart phone 300 which has one or more cameras. The physical lens data for a smart phone camera is fixed. However, the digital attributes of the lens can be obtained and controlled using the system described herein.

Figure 4:
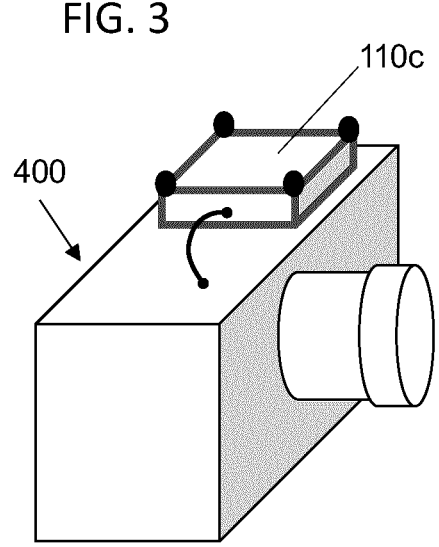
FIG. 4 is a perspective view of a handheld camera with a camera beacon mounted thereon, according to an example embodiment.

FIG. 4 shows an example embodiment of a camera beacon 110c mounted to a handheld camera 400 that includes a camera body and a lens. The physical lens data can be controlled and obtained via the camera body, or directly with the lens body itself.

It will be appreciated that the camera beacon can be mounted to different types of cameras to track the cameras and control the image outputs from the cameras.

Figure 5:
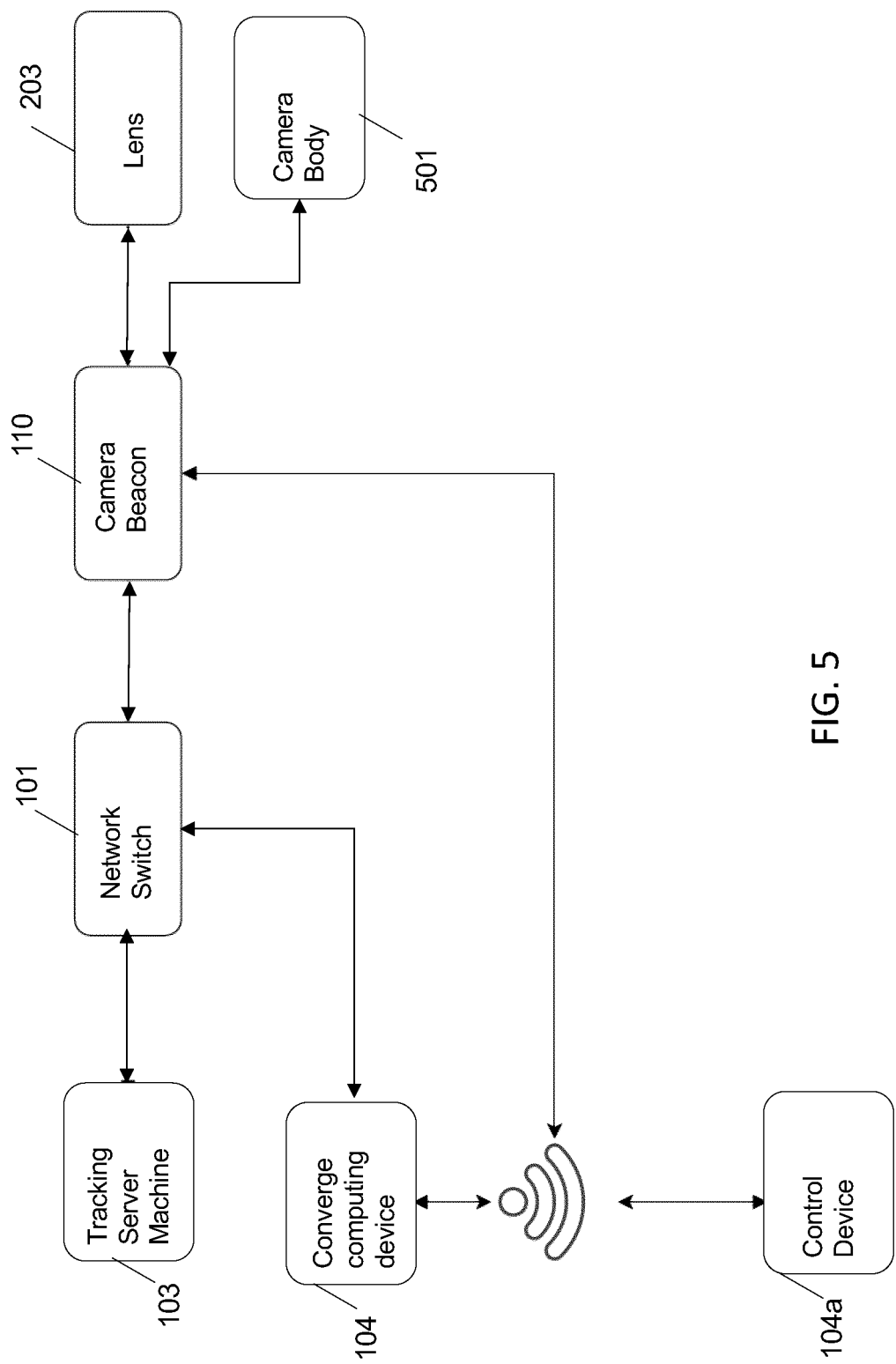
FIG. 5 is a schematic diagram showing how components in a system are in data communication with each other, according to an example embodiment.

FIG. 5 shows another example embodiment of the overall system. The tracking server 103, the converge computing device 104 and the camera beacon 110 are connected to the data network 101 (e.g. a network switch) via data cables, such as, but not limited to, Ethernet cables. The camera beacon 110 is in data connection with the lens 203 via a data cable, such as, but not limited to, a RS422 cable. In another example, either in addition or in alternative, the camera beacon is in data connection with the electronic system of the camera body 501. For example, a digital single-lens reflex (SLR) camera body or a digital mirrorless camera body has an electronic system that can be connected to the camera beacon 110. For example, the data connection between the camera beacon and the camera body 501 is a wired data connection. The camera beacon 110 and the converge computing device 104 have wireless communication capabilities and wirelessly communicate with a control device 104a. In another example, the control device 104a is in wired data connection with the converge computing device 104.

Figure 6:
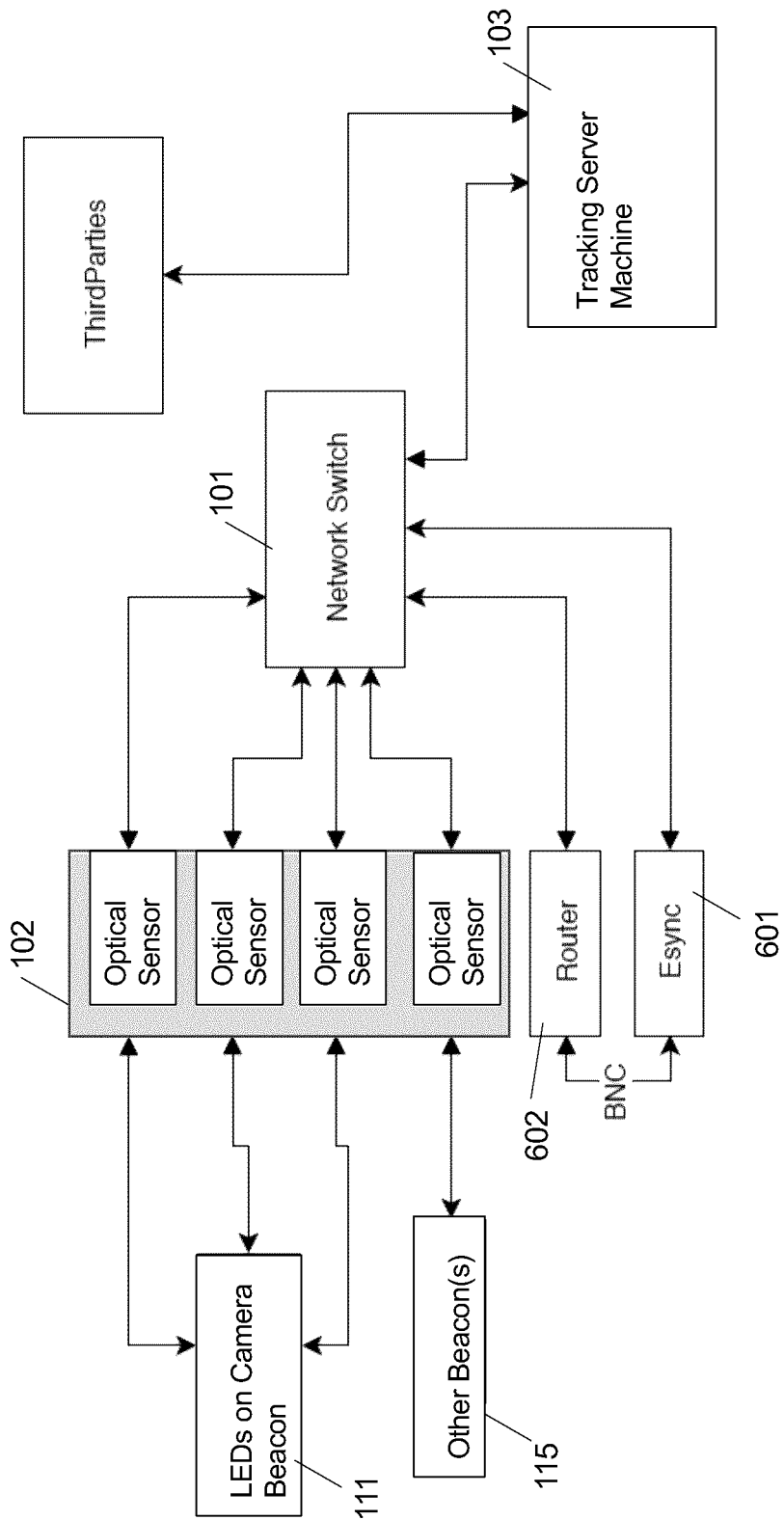
FIG. 6 is a schematic diagram showing how components used for tracking are in data communication with each other, according to an example embodiment.

FIG. 6 shows another example embodiment of the overall system, in this case showing the optical sensors 102 that are used to track the LEDs on the camera beacon 111 and the LEDs on other beacons, such as the target beacon 114. These optical sensors 102 are also connected to the data network 101.

A time synchronization device 601 is connected to the data network 101 to synchronize the all devices according to a time code. This time synchronization device 601 is also connected to a router 602 directly via a BNC (Bayonet Neill-Concelman) cable and indirectly via the data network 101. Some examples of applicable time synchronization approaches include the industry names eSync and genlock (e.g. generator locking).

In an example embodiment, a camera beacon is connected to the time synchronization device 601 via a data cable (e.g. a BNC cable) to receive time synchronization data. In another example embodiment, a camera beacon uses its wireless communication system to wirelessly receive time synchronization data originating from the time synchronization device 601.

Figure 7:
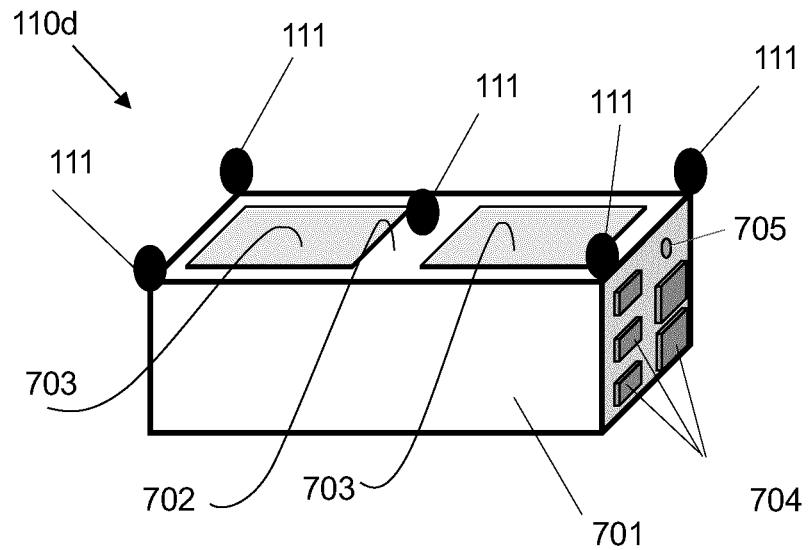
FIG. 7 is a perspective view of a camera beacon shown in isolation, according to an example embodiment.

FIG. 7 shows an example embodiment of a camera beacon 110d. The camera beacon includes a structure that holds multiple LEDs 111 that each flash or blink a unique pattern or frequency. The structure, for example, is the body 701 or a separate structure. More generally, the LEDs are in fixed space relation to each other on a structure that is mounted to a camera. In an example embodiment, there are five or more LEDs that are spread apart from each other. In an example embodiment, there are six or more LEDs that are spread apart from each other. In an example embodiment, there are seven or more LEDs that are spread apart from each other. It will be appreciated that the number of LEDs can vary. In an example embodiment, four LEDs are positioned at the outermost corners of the upward face and one LED is positioned in the middle to maximize the distance between the LEDs. In this way, the LEDs are easier to detect by the optical sensors.

In an example aspect, the LEDs are flush with or embedded within the surface of the body of the camera beacon. In another example aspect, the LEDs protrude from the body of the camera beacon.

In an example aspect, the upward face 702 also has on its surface one or more display screens 703 that display information about the camera beacon 110d or information about the camera to which it is attached, or both. It will be appreciated that, in some examples, there are no display screens mounted on the body.

The body of the camera beacon also includes multiple data ports 704 to connect with various devices. In an example embodiment, the camera beacon draws its power from a power supply via a power port 705. Alternatively, the camera beacon draws its power via one of the data cables.

In an example aspect, the camera beacon connects to lenses via a data cable. In an example aspect, the camera beacon connects to a camera body via a data cable. In an example aspect, the camera beacon connects to one or more external tracking beacons via a data cable. In a further example, these external tracking beacons are affixed onto an object (e.g. a trackable hood or some other object). In an example aspect, the camera beacon connects to another electronic device via a data cable.

In an example aspect, the camera beacon includes a battery that is rechargeable. In another example aspect, the camera beacon draws power directly via the power port 705, for use to power the camera beacon or to recharge the battery, or both.

Figure 8:
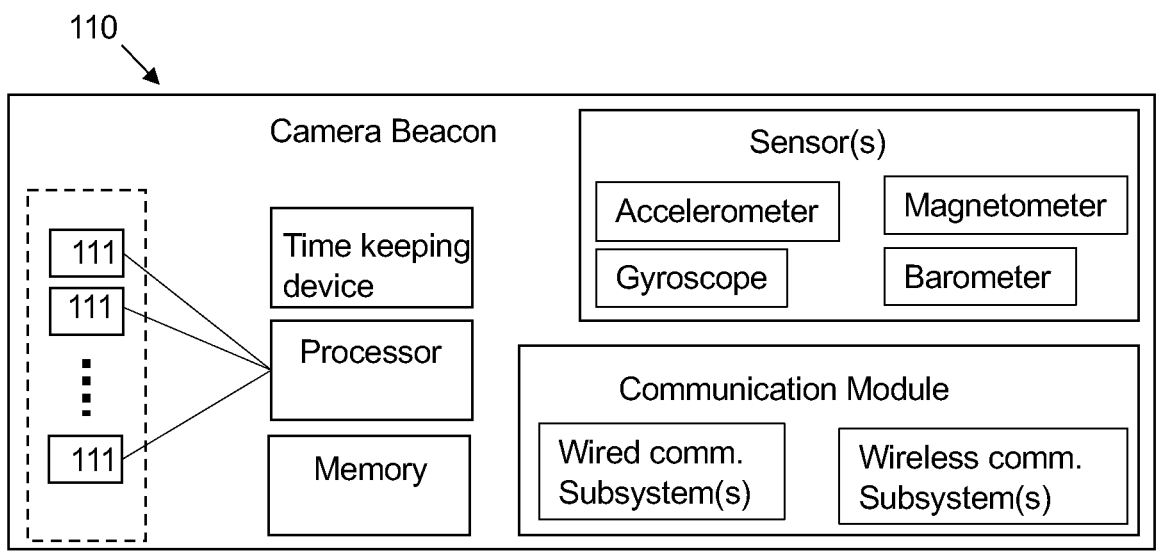
FIG. 8 is a schematic diagram of components of a camera beacon, according to an example embodiment.

FIG. 8 shows example components of the camera beacon 110. It includes three or more LEDs 111, which are each individually controlled by an onboard processor. The three LEDs help to define a rigid body in three dimensional space. The camera beacon also includes a local time keeping device, memory, one or more sensors, and a communication module. The sensors include one or more inertial sensors, such as an accelerometer and a gyroscope. The sensors also include, for example, a magnetometer and a barometer. The communication muddle includes one or more wired communication subsystems (e.g. configured for different data protocols like Ethernet and RS422) and one or more wireless communication subsystems (e.g. WiFi, Bluetooth, etc.).

In an example aspect, the camera beacon receives time synchronization data from an external time synchronization device 601 via a wired connection (e.g. a BNC connection or other type of wired connection). In an example aspect, the camera beacon receives time synchronization data from an external time synchronization device via a wireless connection.

Figure 9:
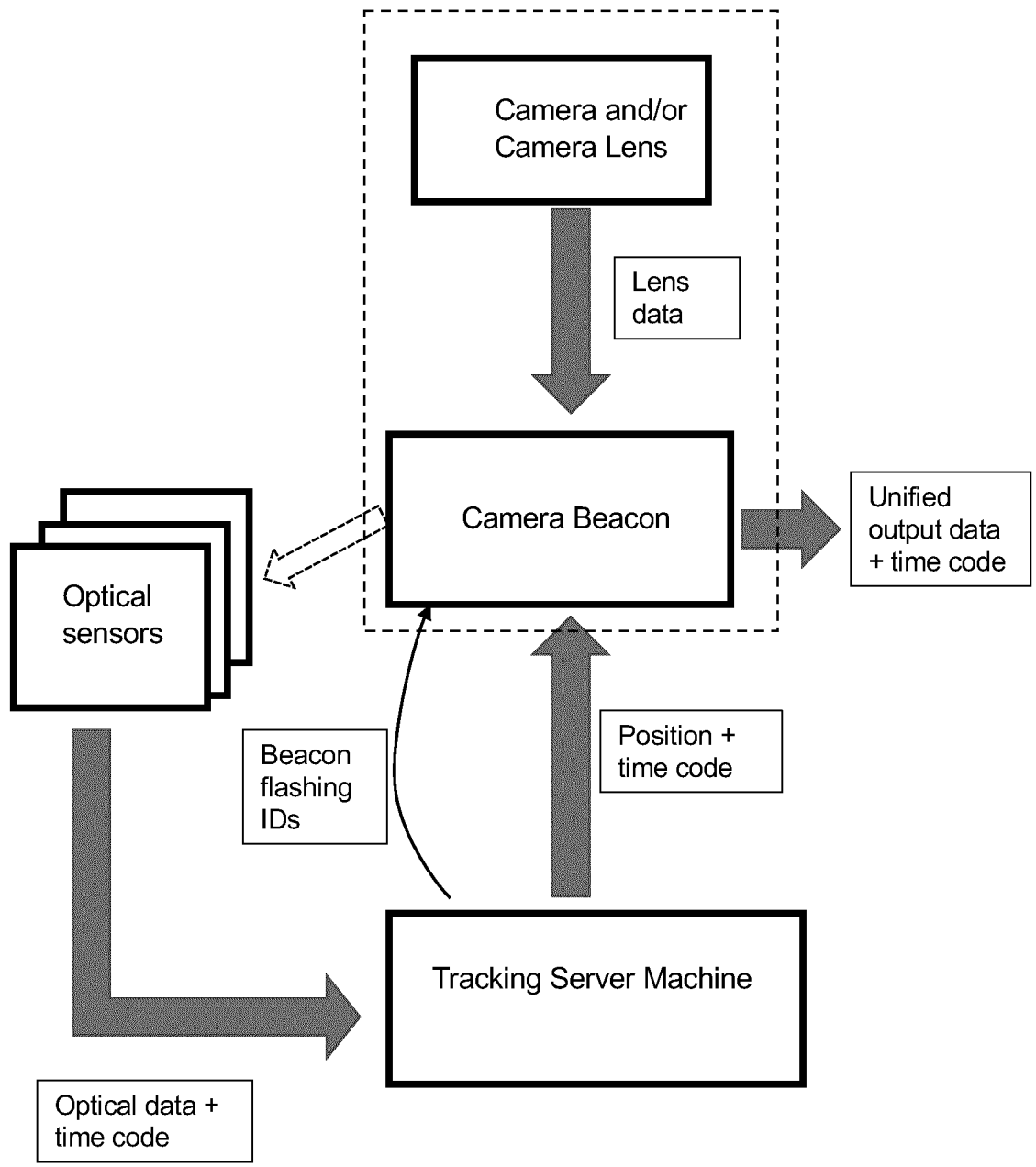
FIG. 9 is a flow diagram of data amongst components in the system, according to an example embodiment.

FIG. 9 shows the flow of data according to an example embodiment. The camera or the camera lens itself transmits lens data to the camera beacon. The LEDs on the camera beacon are detected by the optical sensors. The optical sensors output the optical data, which include images of the LEDs on the camera beacon, and a time code. The tracking server receives this optical data and time code and processes the same to output a position of the camera beacon and corresponding time code. The camera beacon locally computes unified output data and corresponding time code, that includes, amongst other things, the position of the camera, the orientation of the camera and lens data (e.g. focus parameters, iris parameters, zoom parameters, etc.).

Figure 10:
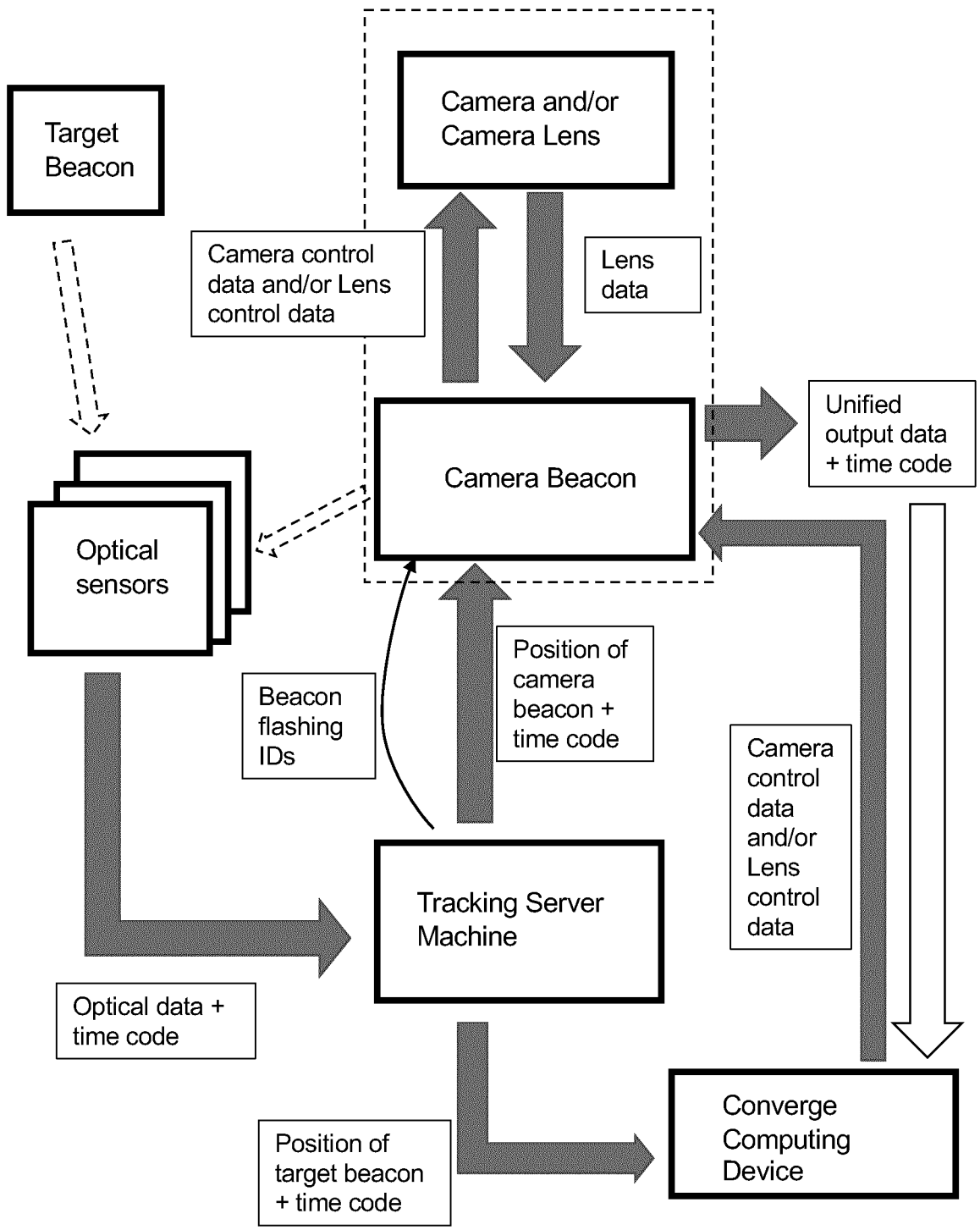
FIG. 10 is a flow diagram of data amongst components in the system, including for controlling a camera in relation to a target beacon, according to an example embodiment.

FIG. 10 is similar to FIG. 9, but further includes operations for affecting the camera to focus on imaging a target beacon (e.g. the target beacon 115) or to avoid the target beacon.

The target beacon includes an LED that emits light that is also detected by the optical sensors. The tracking server processes the optical data to also obtain the position of the target beacon and corresponding time code. The converge computing system (e.g. wired device 104 or wireless device 104a, or both) obtains this position data of the target beacon and the corresponding time code. The converge computing system also obtains the unified output data and corresponding time code from the camera beacon. The converge computing system then uses this obtained data, optionally along with user input provided via a GUI, to compute and output camera control data or lens control data, or both. For example, the converge computing system control the camera image to center and focus the image on the target beacon, or at a position offset from the target beacon.

For example, if the target beacon is positioned on the chest of a person, and the intended focus is on the person's face, then the converge computing system includes a distance offset that estimates the position of the person's face relative to the target beacon. The converge computing system then computes the camera parameters or the lens parameters to focus on the estimated position of the person's face.

In another example, the converge computing system computes a camera parameters and lens parameters so that the target beacon is not captured by the camera.

This outputted control data is transmitted to the camera beacon, and the camera beacon then transmits this control data to the camera, or to the lens, or both. In turn, if camera data is transmitted, then the camera itself is controlled to affect the image obtained by the camera, relative to the position of the target beacon. In turn, if lens data is transmitted, then the lens itself is controlled to affect the image obtained by the camera, relative to the position of the target beacon.

Figure 11:
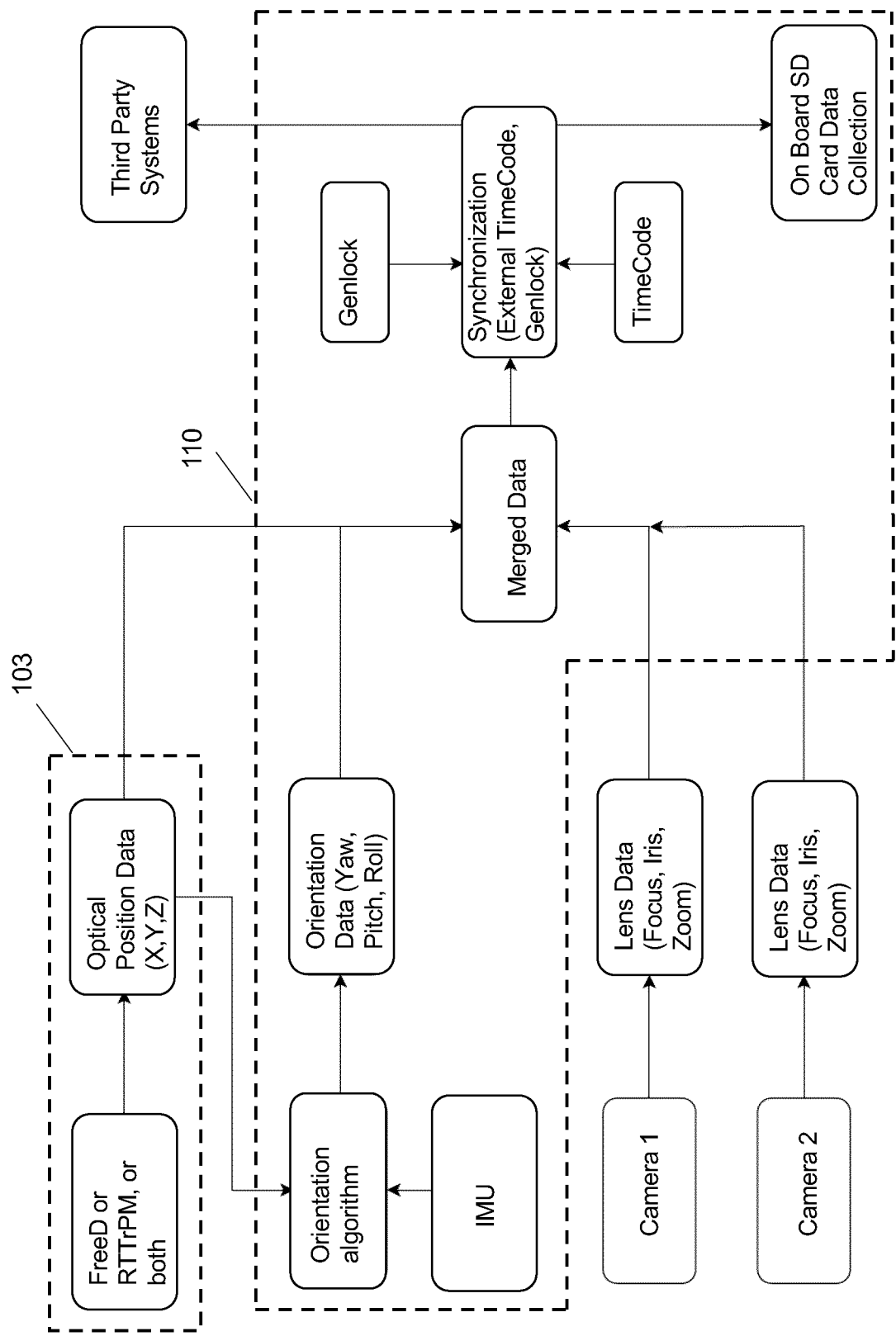
FIG. 11 is a flow diagram of data amongst components in the system, including computations executed by the camera beacon, according to an example embodiment.

Turning to FIG. 11, the tracking server 103 executes a real-time tracking process for detecting position of the LEDs of the beacons using the optical data, and outputs the position (e.g. X, Y, Z coordinates) of each LED. This position data is transmitted to the camera beacon, which executes an orientation computation to output the orientation data (e.g. yaw, pitch, roll). The orientation computed can be computed, for example, using just the position coordinates of the LEDs 111. Alternatively, the current position can be computed by combining the IMU data with the last known position data. This approach is a helpful alternative when one or more LEDs 111 are occluded from detection by the optical sensors and the optical position data is insufficient to obtain the orientation of the camera beacon.

The camera beacon 110 also obtains lens data from a camera on to which it is mounted (e.g. camera 1). The lens data, the orientation data, and the position data are merged together in a synchronized manner (e.g. using a time code or genlock), to create a unified output. This unified output is sent to one or more external systems or devices, and is also stored in local memory on the camera beacon 110.

In an example aspect, there may also be another camera (e.g. camera 2) that has its lens data feeding into the same camera beacon.

It will be appreciated that, in FIG. 11, the FreeD protocol and the RTTrPM (Real Time Tracking Protocol-Motion) are referenced as ways to transmit tracked motion information. These protocols, as well as other currently known and future known protocols for transmitting tracked motion information can be used for tracking a camera.

Figure 12:
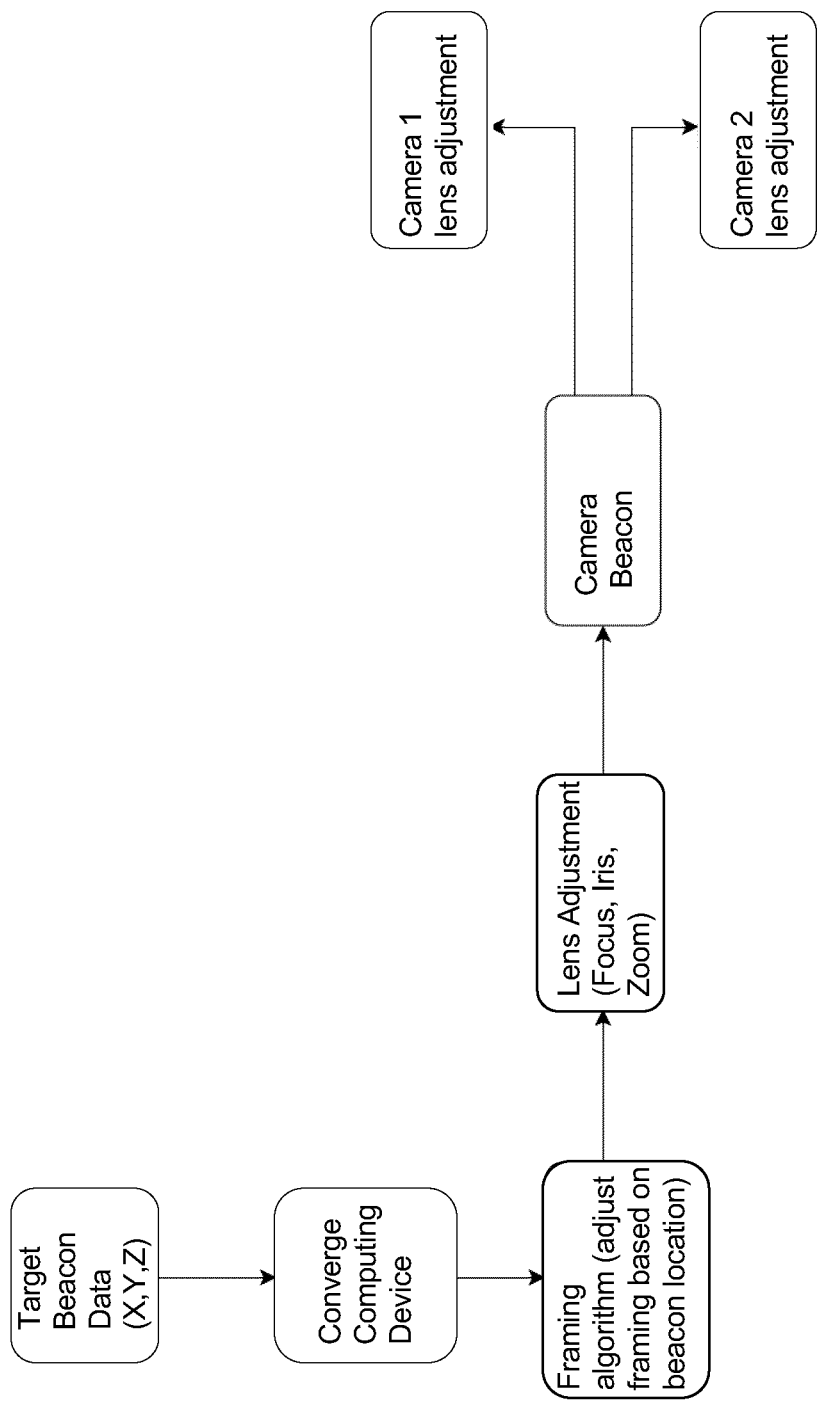
FIG. 12 is a flow diagram of data amongst components in the system, including computations executed to control a camera in relation to a target beacon, according to an example embodiment.

FIG. 12 shows a process for using the unified output and the location data of a target beacon. The converge computing device executes, for example, a framing process to adjust the image framing and the image focus based on the position coordinates of the target beacon. This desired image framing and image focus is used to compute desired lens parameters and, optionally, desired camera parameters (e.g. positioning of the camera, orientation of the camera, etc.). These parameters are sent to the camera beacon, which accordingly computes adjustments to the camera lens of camera 1, as well as optionally the adjustments to the lens of camera 2.

Figure 13:
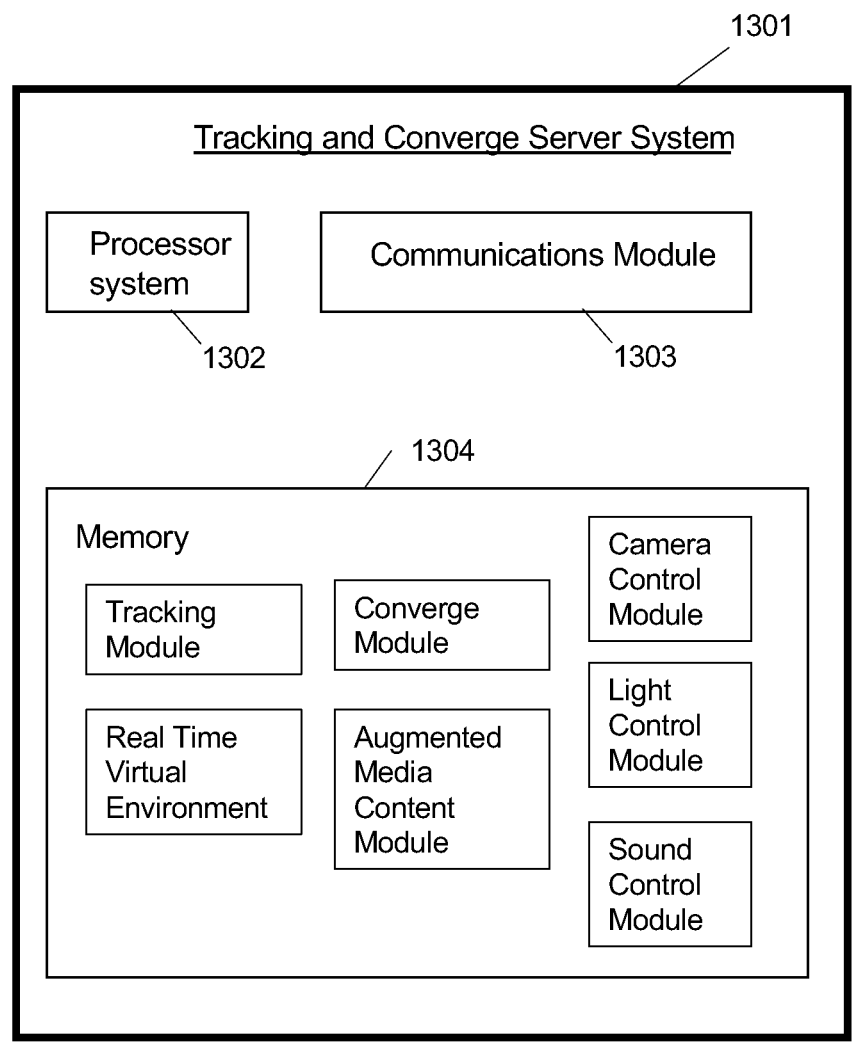
FIG. 13 is a schematic diagram of an integrated server machine for tracking beacons and controlling image output of a camera, according to an example embodiment.

FIG. 13 shows another example embodiment of a server system 1301 that is connected to the data network 101, which is alternative to the tracking server 103 and the converge computing device 104. The server system 1301 shown in FIG. 13 includes a processor system 1302 and a communication module 103. The server system, for example, is one server or a group of servers in data communication with each other. The server system 1301 also includes memory 1304 that stores thereon various software modules, including a tracking module for tracking beacons, including and not limited to a camera beacon. Another software module is a converge module that implements computations for camera control or lens control, or both. The software modules also include a real time virtual environment that stores virtual representations of physical objects and people in the physical world. For the physical objects being tracked by the beacons (e.g. camera tracked by camera beacon, person tracked by target beacon, etc.), the virtual representations of these physical objects are updated in real time in the virtual environment. The server also includes an augmented media content module for layering in augmented media content with the image data captured by a camera. The augmented media content, for example, is visualized and controlled in the virtual environment and outputted as finished video content. The server, for example, also includes modules to control one or more robotic cameras, automated camera lenses, robotic lights, and sound systems.

Figure 14:
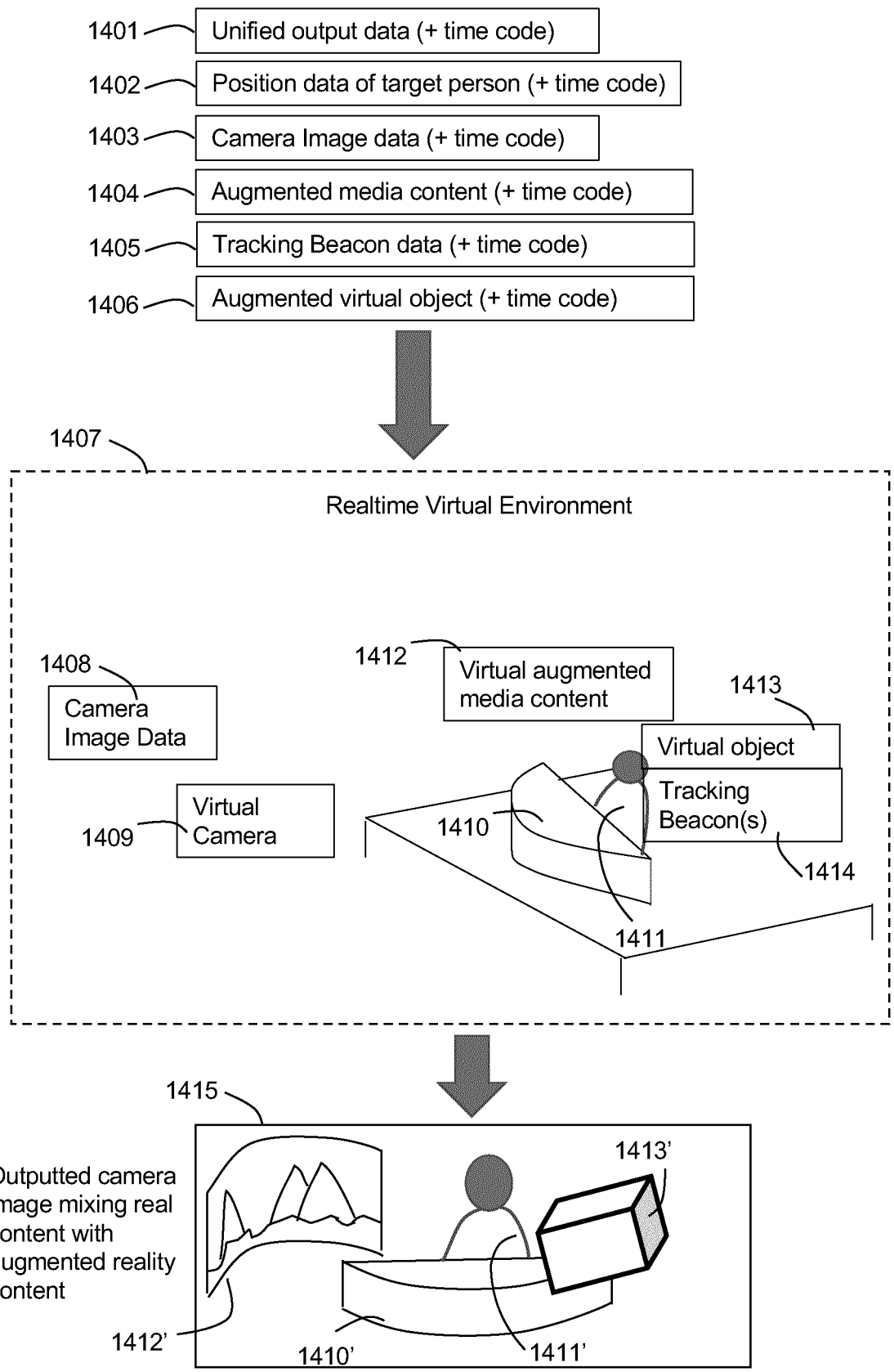
FIG. 14 is a schematic diagram showing outputs of data at different stages to generate real-time augmented reality images derived from a camera that is being tracked, according to an example embodiment.

Turning to FIG. 14, an example embodiment is shown that includes one or more data types: the unified output data from a camera beacon 1401, position data of a target person 1402, camera image data from the camera 1403, augmented media content 1404, positional data from one or more tracking beacons 1405, and augmented virtual object data that is linked to the positional data of the one or more tracking beacons 1406. In an example aspect, the position data of a target person 1402 is tracked by a target tracking beacon attached to a real world person. In an example aspect, these one or more of these different data are synchronized and combined for representation in the real time virtual environment 1407.

For example, the real time virtual environment 1407 includes the camera image data 1408 (e.g. the images or video images captured by a real camera) and the position and orientation of a virtual camera 1409 corresponding to the physical camera. The virtual environment 1407 also includes a virtual model of a desk corresponding to a physical desk 1410, and a virtual model of a real person being tracked using a target beacon in physical world 1411. In another example aspect, the virtual environment does not specifically include the model of the physical desk, but rather includes images of the real world obtained by a camera, and these images of the real world includes images of the physical desk and other real world objects. These real world objects, for example, are placed in front of a green backdrop so that virtual objects and virtual media content can be more easily integrated with the images of the real world objects and real world people. The layering of virtual objects or virtual media content, or both, with the real world images is called mixed virtual reality or augmented reality.

In another example aspect, the virtual environment 1407 includes instances of virtual augmented media content 1412 and virtual objects 1413 positioned around the virtual model of the person and in front of the virtual camera. The resulting outputted image mixes the camera image with augmented reality content.

In an example aspect, the virtual object 1413 is paired to the position information of one or more tracking beacons 1414. In particular, the tracking beacons 1414 are physical devices that can be positionally tracked in the real world. In another example, the orientation of the one or more tracking beacons can be measured. The position and the orientation data of the one or more tracking beacons are used to determine the position and orientation of the virtual object 1413. For example, the virtual object is a virtual box.

The virtual content 1412 and 1413 are rendered in a mixed reality outputted image 1415. In particular, the outputted image 1415 includes a rendered image of the virtual media content 1412', a rendered image of the virtual object 1413' and the camera's captured image content of the physical desk 1410' and the physical person 1411' from the real world. The renderings of the virtual media content 1412' and the virtual object 1413' are automatically updated by the server system 1301 as the camera's position (as tracked using the camera beacon) moves through the real world.

In an example aspect, as the physical camera moves position and orientation in the real world (also called the physical world), the corresponding virtual camera also moves position and orientation in the virtual environment. This means that the perspective and size of the augmented media content (e.g. purely virtual content) relative to the point of view from the virtual camera will also change. The resulting outputted image includes the updated camera image data with the layered augmented virtual objects that are visually rendered to reflect a corresponding updated size and perspective relative to the virtual camera's new position and orientation.

In an example aspect, the position of a person 1411 (or their virtual model) is determined by position data 1402 derived from tracking a target tracking beacon attached to the physical person. The server system 1301 uses this data 1402 and the data from the camera beacon 1401 to automatically crop an image or automatically adjust camera control parameters, or both, to properly frame the person in the displayed image.

Other example features of the devices and systems are provided below.

In an example embodiment, the camera beacon device uses a tracking system that uses optical tracking to identify unique infrared pulses originating from the camera beacon. The camera beacon can marry the infrared tracking data with the IMU tracking data within the camera beacon in order to increase accuracy as well as provide for occlusion coverage during times when the optical system is not in site.

The camera beacon's tracking data is then synchronized with several additional data points such as lens data in real time derived directly from the camera and or lens. The camera beacon has the ability to combine other meta data from external systems. The camera beacon's data is synchronized via timecode or genlock, or another time synchronization technology that is currently known or future known.

A non-limiting example of a unified output from the camera beacon includes a data structure packaged into a 29 Byte struct.

For example, the data structure is the following:

| Pos | Name | Size | Value Format |
|---|---|---|---|
| 0 | Header | 1 | Const |
| 1 | Camera ID | 1 | Const |
| 2 | Yaw | 3 | 12-Bit Signed int |
| 5 | Pitch | 3 | 12-Bit Signed int |
| 8 | Roll | 3 | 12-Bit Signed int |
| 11 | X | 3 | 12-Bit Signed int |
| 14 | Y | 3 | 12-Bit Signed int |
| 17 | Z | 3 | 12-Bit Signed int |
| 20 | Zoom | 3 | 12-Bit Signed int |
| 23 | Focus | 3 | 12-Bit Signed int |
| 26 | Iris | 2 | 8-Bit Signed int |
| 28 | Check Sum | 1 | Char |
| | Total Size | 29 | |

It will be appreciated that the data structure of the unified output can vary from what is shown in the example above.

Below are general example embodiments and example aspects.

In a general example embodiment, a camera beacon apparatus is provided and it includes: a structure mountable onto a camera device; three or more light sources positioned on the structure; a memory for storing an identifier of the camera device; and a processor configured to at least control the three or more light sources to respectively flash according to three or more uniquely identifiable flashing patterns, and each one of the three or more uniquely identifiable flashing patterns are associated with the identifier of the camera device.

In an example aspect, the three or more light sources are positioned at a perimeter of the structure.

In an example aspect, the three or more light sources are infrared light sources.

In an example aspect, the camera beacon apparatus further includes a data port to receive lens data from a lens of the camera device.

In an example aspect, the camera beacon apparatus further includes a data port to receive operational parameters from the camera device.

In an example aspect, the camera beacon apparatus further includes a time keeper to synchronize data processed by the camera beacon apparatus.

In an example aspect, the camera beacon apparatus further includes an inertial measurement unit (IMU), and inertial data of the IMU is outputted in association with the identifier of the camera device.

In an example aspect, the camera beacon apparatus further includes: a first data port to receive position information of the camera beacon apparatus, the position information determined by tracking the three or more light sources; a second data port to receive lens data from a lens of the camera device; and the processor is configured to further provide an output that comprises the identifier of the camera device, the position information and the lens data.

In an example aspect, the output further comprises a time code that synchronizes the position data and the lens data.

In an example aspect, the structure is mountable to a top surface of the camera device.

In an example aspect, the structure is mountable to a hood of the camera device.

In an example aspect, the camera beacon apparatus further includes a data port that transmits control data to control a lens parameter of the camera device.

In an example aspect, the camera beacon apparatus further includes a data port that transmits control data to control at least one of focus, iris and zoom of the camera device.

In an example aspect, the three or more lights sources comprise light emitting diodes that are rigidly positioned in spaced relation to each other.

In an example aspect, the three or more light sources are embedded in a surface of the structure.

In an example aspect, the three or more light sources protrude from the structure.

In an example aspect, the camera beacon apparatus further includes an ancillary light source that is controllable by the processor to flash according an ancillary unique identifiable flashing pattern, and the ancillary light source is connected to the structure via a wire.

In an example aspect, the ancillary light source is mountable on the camera device to identify a position of an imaging sensor.

In another general example embodiment, a camera beacon is provided that includes: a body mountable onto a camera device; three or more light sources positioned on the body; a first data port for at least receiving lens data from a lens of the camera device; a second data port for at least receiving position data of the three or more light sources; and a processor. The process is configured to at least: individually control three or more different flashing patterns corresponding to each of the three or more light sources, and compute a unified output that comprises lens data, position data of the camera beacon, and orientation data of the camera beacon.

In an example aspect, the three or more light sources comprise infrared light emitting diodes.

In an example aspect, the three or more light sources protrude from the body in a fixed spaced relation to each other.

In an example aspect, the three or more light sources are embedded in a surface of the body in fixed spaced relation to each other.

In an example aspect, the camera beacon further includes an inertial measurement unit.

In an example aspect, the unified output further comprises a time code that synchronizes the lens data, the position data and the orientation data.

In another general example embodiment, a camera that is trackable is provided, and it includes: a camera body that houses an image sensor; and a camera beacon mounted to the camera body. The camera beacon includes: a structure; three or more light sources positioned on the structure; a memory for storing an identifier of the camera; a processor configured to at least control the three or more light sources to respectively flash according to three or more uniquely identifiable flashing patterns, and each one of the three or more uniquely identifiable flashing patterns are associated with the identifier of the camera.

In an example aspect, the camera further includes a lens, and wherein the camera beacon further includes a data port that is in wired data communication with the lens.

In an example aspect, the camera beacon receives lens data via the data port, and the camera beacon outputs the lens data in association with the identifier of the camera.

In an example aspect, the camera beacon further includes an inertial measurement unit, and the camera beacon outputs inertial measurement data in association with the identifier of the camera.

In an example aspect the camera beacon is mounted onto a top surface of the camera body.

In an example aspect, the three or more light sources protrude from the structure in fixed spaced relation to each other.

In an example aspect, the three or more light sources are embedded in a surface of the structure in fixed spaced relation to each other.

In an example aspect, the camera further includes a camera hood mounted at a lens of the camera, and the structure that holds the three or more light sources is attached to the camera hood.

In an example aspect, the camera body further houses an electronic system, and the camera beacon is in data communication with the electronic system.

In another general example embodiment, a system is provided for tracking a camera and processing images from the camera. The system includes: a camera beacon mountable onto the camera. The camera beacon includes: a memory for storing an identifier of the camera; a processor configured to at least control the three or more light sources to respectively flash according to three or more uniquely identifiable flashing patterns, and each one of the three or more uniquely identifiable flashing patterns are associated with the identifier of the camera. The system also includes an optical tracking system, which includes at least two spaced apart optical sensors that visually track a position of the camera beacon using the three or more light sources. The system also includes a server system that receives images captured from the camera and the position data of the camera beacon, and synchronizes the images and the position data using a time code.

In an example aspect, the server system further stores thereon a virtual object that is integrated into the images captured from the camera, and the server system computes a rendering of the virtual object based on at least the position data of the camera beacon.

In an example aspect, the server system further stores thereon a virtual media content that is integrated into the images captured from the camera, and the server system computes a rendering of the virtual media content based on at least the position data of the camera beacon.

In an example aspect, the server system automatically modifies the images captured by the camera based at least on the position data.

In an example aspect, the server system automatically modifies the images by cropping the images.

In an example aspect, the system further includes a target tracking beacon that is visually trackable by the optical tracking system, and the server system further receives and synchronizes position data of the target tracking beacon with the images and the position data of the camera beacon.

In an example aspect, the server system automatically modifies the images captured by the camera based on the position data of the camera beacon and the position data of the target tracking beacon.

In an example aspect, the server system automatically controls the camera based on the position data of the camera beacon and the position data of the target tracking beacon.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, EEPROM, flash memory or other memory technology, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or nodes, or accessible or connectable thereto. Any application or module herein described may be implemented using computer readable/executable instructions that may be stored or otherwise held by such computer readable media.

It will be appreciated that different features of the example embodiments of the system, the devices, and the components as described herein, may be combined with each other in different ways. In other words, different devices, modules, operations, functionality and components may be used together according to other example embodiments, although not specifically stated.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A camera beacon comprising:
 a body mountable onto a camera device;
 three or more light sources positioned on the body;
 a first data port on the body for at least receiving lens data from a lens of the camera device;
 a second data port on the body for at least receiving position data of the three or more light sources; and
 a processor within the body is configured to at least: individually control three or more different flashing patterns corresponding to each of the three or more light sources, append a time code to the lens data, and compute a synchronized and unified output that comprises the time code, the lens data, position data of the camera beacon, and orientation data of the camera beacon.

2. The camera beacon of claim 1 is further configured to receive at least one of camera control data and lens control data that is transmittable from an external computing device, and the camera beacon is further configured to transmit at least one of the camera control data and the lens control data to at least one of the camera device and the lens.

3. The camera beacon of claim 1 wherein the three or more light sources protrude from the body in a fixed spaced relation to each other.

4. The camera beacon of claim 1 wherein the three or more light sources are embedded in a surface of the body in fixed spaced relation to each other.

5. The camera beacon of claim 1 wherein the synchronized and unified output comprises a data structure that comprises a camera ID value, a yaw value, a pitch value, a roll value, an X coordinate value, a Y coordinate value, a Z coordinate value, a zoom value, a focus value, and an iris value; wherein the position data of the camera beacon comprises the X coordinate value, the Y coordinate value and the Z coordinate value; wherein the orientation data of the camera beacon comprises the yaw value, the pitch value, and the roll value; and wherein the lends data comprises the zoom value, the focus value, and the iris value.

6. The camera beacon of claim 1 further comprising a cable and an ancillary light source, wherein the ancillary light source is mountable on a certain position on the camera device that identifies an image sensor position within the camera device, and the camera beacon is configured to power and control the ancillary light source via the cable to flash according to an ancillary identifiable flashing pattern.

7. A system for tracking a camera and processing images from the camera, comprising:
 a camera beacon mountable onto the camera, the camera beacon comprising: a memory for storing an identifier of the camera; a processor configured to at least control the three or more light sources to respectively flash according to three or more uniquely identifiable flashing patterns, and each one of the three or more uniquely identifiable flashing patterns are associated with the identifier of the camera;
 an optical tracking system comprising at least two spaced apart optical sensors that are configured to visually track a position of the camera beacon using the three or more light sources;
 a server system that is configured to receive images captured from the camera and position data of the camera beacon, and synchronize the images and the position data using timing data; and
 wherein the server system further stores thereon a virtual media content that is integrated into the images captured from the camera, and the server system is further configured to compute a rendering of the virtual media content based on at least the position data of the camera beacon.

8. The system of claim 7 wherein the server system further stores thereon a virtual object that is integrated into the images captured from the camera, and the server system is further configured to compute a rendering of the virtual object based on at least the position data of the camera beacon.

9. The system of claim 7 wherein the server system is further configured to automatically modify the images captured by the camera based at least on the position data.

10. The system of claim 9 wherein the server system is further configured to automatically modify the images by cropping the images.

11. The system of claim 7 further comprising a target tracking beacon that is visually trackable by the optical tracking system, and the server system is further configured to receive and synchronize position data of the target tracking beacon with the images and the position data of the camera beacon.

12. The system of claim 11 wherein the server system is further configured to automatically modify the images captured by the camera based on the position data of the camera beacon and the position data of the target tracking beacon.

13. The system of claim 11 wherein the server system is further configured to automatically control the camera based on the position data of the camera beacon and the position data of the target tracking beacon.

14. The system of claim 7 wherein the camera beacon receives timing data via a wired data connection.

15. The system of claim 7 wherein the camera beacon receives timing data via a wireless data connection.

16. The system of claim 7 wherein the camera beacon comprises a body, and the camera beacon further comprises:
- a first data port on the body for at least receiving lens data from a lens of the camera;
- a second data port on the body for at least receiving position data of the three or more light sources; and
- wherein the processor is positioned within the body and is further configured to at least: append a time code to the lens data, and compute a synchronized and unified output that comprises the time code, the lens data, position data of the camera beacon, and orientation data of the camera beacon.

17. A system for tracking a camera and processing images from the camera, comprising:
- a camera beacon mountable onto the camera, the camera beacon comprising: a memory for storing an identifier of the camera; a processor configured to at least control the three or more light sources to respectively flash according to three or more uniquely identifiable flashing patterns, and each one of the three or more uniquely identifiable flashing patterns are associated with the identifier of the camera;
- an optical tracking system comprising at least two spaced apart optical sensors that are configured to visually track a position of the camera beacon using the three or more light sources;
- a server system that is configured to receive images captured from the camera and position data of the camera beacon, and synchronize the images and the position data using timing data; and
- wherein the server system further stores thereon a virtual object that is integrated into the images captured from the camera, and the server system is further configured to compute a rendering of the virtual object based on at least the position data of the camera beacon.

18. The system of claim 17 wherein the server system is further configured to automatically modify the images captured by the camera based at least on the position data.

19. The system of claim 18 wherein the server system is further configured to automatically modify the images by cropping the images.

20. The system of claim 17 further comprising a target tracking beacon that is visually trackable by the optical tracking system, and the server system is further configured to receive and synchronize position data of the target tracking beacon with the images and the position data of the camera beacon.

21. The system of claim 20 wherein the server system is further configured to automatically modify the images captured by the camera based on the position data of the camera beacon and the position data of the target tracking beacon.

22. The system of claim 20 wherein the server system is further configured to automatically control the camera based on the position data of the camera beacon and the position data of the target tracking beacon.

23. The system of claim 17 wherein the camera beacon comprises a body, and the camera beacon further comprises:
- a first data port on the body for at least receiving lens data from a lens of the camera;
- a second data port on the body for at least receiving position data of the three or more light sources; and
- wherein the processor is positioned within the body and is further configured to at least: append a time code to the lens data, and compute a synchronized and unified output that comprises the time code, the lens data, position data of the camera beacon, and orientation data of the camera beacon.

24. A system for tracking a camera and processing images from the camera, comprising:
- a camera beacon mountable onto the camera, the camera beacon comprising: a memory for storing an identifier of the camera; a processor configured to at least control the three or more light sources to respectively flash according to three or more uniquely identifiable flashing patterns, and each one of the three or more uniquely identifiable flashing patterns are associated with the identifier of the camera;
- an optical tracking system comprising at least two spaced apart optical sensors that are configured to visually track a position of the camera beacon using the three or more light sources;
- a server system that is configured to receive images captured from the camera and position data of the camera beacon, and synchronize the images and the position data using timing data;
- a target tracking beacon that is visually trackable by the optical tracking system, and the server system is further configured to receive and synchronize position data of the target tracking beacon with the images and the position data of the camera beacon; and
- wherein the server system is further configured to automatically control the camera based on the position data of the camera beacon and the position data of the target tracking beacon.

25. The system of claim 24 wherein the server system is further configured to transmit camera control data to the camera beacon, and the camera beacon is further configured to transmit the camera control data to the camera.

26. The system of claim 24 wherein the server system is further configured to transmit lens control data to the camera beacon, and the camera beacon is further configured to transmit the lens control data to a lens of the camera.

27. The system of claim 24 wherein the camera beacon comprises a body, and the camera beacon further comprises:
- a first data port on the body for at least receiving lens data from a lens of the camera;
- a second data port on the body for at least receiving position data of the three or more light sources; and
- wherein the processor is positioned within the body and is further configured to at least: append a time code to the lens data, and compute a synchronized and unified output that comprises the time code, the lens data, position data of the camera beacon, and orientation data of the camera beacon.

* * * * *